United States Patent
Mukouyama

(10) Patent No.: US 9,503,314 B2
(45) Date of Patent: Nov. 22, 2016

(54) WIRELESS TRANSMISSION DEVICE, FAILURE-INFORMATION FORWARDING METHOD, AND FAILURE-INFORMATION NOTIFICATION METHOD

(71) Applicant: Motohiro Mukouyama, Tokyo (JP)

(72) Inventor: Motohiro Mukouyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 39 days.

(21) Appl. No.: 14/356,373

(22) PCT Filed: Nov. 6, 2012

(86) PCT No.: PCT/JP2012/078713
§ 371 (c)(1),
(2) Date: May 5, 2014

(87) PCT Pub. No.: WO2013/069629
PCT Pub. Date: May 16, 2013

(65) Prior Publication Data
US 2014/0301212 A1  Oct. 9, 2014

(30) Foreign Application Priority Data

Nov. 11, 2011 (JP) .................. 2011-247377

(51) Int. Cl.
*G01R 31/08* (2006.01)
*H04L 12/24* (2006.01)
(Continued)

(52) U.S. Cl.
CPC ........... *H04L 41/06* (2013.01); *H04L 43/0811* (2013.01); *H04L 69/14* (2013.01); *H04L 69/40* (2013.01); *H04W 24/04* (2013.01)

(58) Field of Classification Search
CPC ....... H04L 41/06; H04L 45/02; H04L 69/40; H04L 1/22
See application file for complete search history.

(56) References Cited

U.S. PATENT DOCUMENTS 6,992,978 B1  1/2006 Humblet et al.
2006/0092826 A1* 5/2006 Karam ............... H04L 1/22
370/216

(Continued)

FOREIGN PATENT DOCUMENTS

JP  5-235809 A  9/1993
JP  2005-217565 A  8/2005

(Continued)

OTHER PUBLICATIONS

Extended European Search Report dated Jun. 19, 2015.

(Continued)

*Primary Examiner* — Robert Wilson
(74) *Attorney, Agent, or Firm* — McGinn IP Law Group, PLLC

(57) ABSTRACT

A wireless transmission device houses a plurality of wireless transmission channels including a first and a second wireless transmission channel. The wireless transmission device includes: a wireless signal transmitting and receiving unit that includes a first wireless port and a second port, the first wireless port transmitting and receiving a wireless signal to and from a first transmission device via the first wireless transmission channel, the second wireless port transmitting and receiving a wireless signal to and from a second transmission device via the second wireless transmission channel; and a control unit that notifies the second transmission device of a failure via the second wireless transmission channel in a case where a failure relating to the first wireless port arises.

8 Claims, 13 Drawing Sheets

(51) Int. Cl.
   *H04W 24/04* (2009.01)
   *H04L 29/14* (2006.01)
   *H04L 29/06* (2006.01)
   *H04L 12/26* (2006.01)

(56) References Cited

U.S. PATENT DOCUMENTS

| | | | |
|---|---|---|---|
| 2006/0173960 | A1 | 8/2006 | Zlateff et al. |
| 2006/0215621 | A1 | 9/2006 | Abdel-Kader et al. |
| 2008/0203150 | A1* | 8/2008 | Royce-Winston .. G06Q 20/0425 235/379 |
| 2008/0305743 | A1* | 12/2008 | Aithal ............... H04L 43/0811 455/67.11 |
| 2009/0067324 | A1 | 3/2009 | Licardie et al. |
| 2010/0103910 | A1 | 4/2010 | Verma |
| 2011/0222396 | A1* | 9/2011 | Tochio ................ H04L 12/437 370/222 |
| 2011/0249551 | A1* | 10/2011 | Rollins ............... H04L 12/437 370/222 |
| 2011/0252144 | A1* | 10/2011 | Tung ..................... A63F 13/12 709/227 |
| 2012/0020207 | A1* | 1/2012 | Corti ..................... H04L 45/02 370/225 |
| 2012/0020289 | A1* | 1/2012 | Nakajima ................ H04L 1/22 370/328 |
| 2013/0173969 | A1* | 7/2013 | Mukouyama ......... H04L 41/06 714/57 |
| 2014/0301212 | A1* | 10/2014 | Mukouyama ......... H04L 69/40 370/242 |

FOREIGN PATENT DOCUMENTS

| | | |
|---|---|---|
| JP | 2006-067239 A | 3/2006 |
| RU | 2 398 362 C2 | 8/2010 |
| WO | WO 2011/100467 A2 | 8/2011 |
| WO | WO 2011/114837 A1 | 9/2011 |

OTHER PUBLICATIONS

Russian Office Action dated May 26, 2015 with an English translation thereof.
Russian Office Action dated May 21, 2015 with an English translation thereof.
International Search Report in PCT/JP2012/078713 dated Dec. 11, 2012 (English Translation Thereof).
Russian Notice of Allowance dated Dec. 1, 2015 issued in Russian Application No. 2014122987 with an English translation thereof.

* cited by examiner

WIRELESS TRANSMISSION DEVICE, FAILURE-INFORMATION FORWARDING METHOD, AND FAILURE-INFORMATION NOTIFICATION METHOD

TECHNICAL FIELD

The present invention relates to a technique for notifying of a failure between a plurality of wireless transmission devices that are connected so as to be capable of communicating.

BACKGROUND ART

There is known a system that uses a wireless transmission channel in part of a transmission channel to transmit/receive, for example, LAN (local area network) signals, which are standardized in IEEE802.3. In this type of system, a transmission device that is connected to a network device via a wired transmission channel transmits a LAN signal from the network device to an opposite opposing transmission device via a wireless transmission channel. The opposing transmission device outputs the signal received via the wireless transmission channel to the network device, which is connected to the opposing transmission device itself via the wired transmission channel.

Patent Document 1 discloses a method outlined below. That is to say, when a transmission device connected to the above system via the wireless transmission channel detects a failure in the transmission channel (the wired transmission channel and the wireless transmission channel connected to the transmission device), the network device connected to the station itself via the wired transmission channel is notified of the failure. Furthermore, the network device connected to the opposing transmission device via the wired transmission channel is also notified.

In this method, the transmission device cuts the wired transmission channel line connected to the transmission device when a failure in the transmission channel is detected. Furthermore, it converts a control signal sequence for notifying a failure into a data sequence and outputs the signal to the wireless transmission channel to thereby transmit the control signal sequence to the opposing transmission device. Moreover, the transmission device cuts the wired transmission channel of the station itself also when the control signal sequence is received from the opposing transmission device.

According to this method, the transmission device is capable of notifying a network device connected to the station itself of a failure when the transmission device detects a failure in the transmission channel. Furthermore, it is capable of notifying the network device connected to the station itself of a failure also when the opposing transmission device detects a failure in the transmission channel.

In recent years, transition to IP (Internet protocol) is progressing in networking. In systems such as the one mentioned above, the transmission device often houses a plurality of wired transmission channels and includes a switching function.

Patent Document 1 discloses a method in which also in a system with each transmission device housing a plurality of wired transmission channels therein, a failure is notified to each network device connected to the station itself and to each network device connected to the opposing station (FIG. 8 and paragraphs [0076] and [0077] in Patent Document 1).

In this method, each transmission device includes, for each of the plurality of wired transmission channels of the station itself, a function of detecting a failure in the wired transmission channel, a function of detecting a failure in the wireless transmission channel, and a function of outputting the control signal sequence mentioned above to the wireless transmission channel when a failure is detected. Each transmission device cuts the wired transmission channel when a failure is detected and when the control signal sequence is received from the opposing transmission device.

According to this method, also in the system with each transmission device housing a plurality of wired transmission channels therein, the transmission device is capable of notifying a network device connected to the station itself of a failure when the station itself detects a failure in the transmission channel. Furthermore, it is capable of notifying the network device connected to the station itself of a failure also when the opposing transmission device detects a failure in the transmission channel.

The method mentioned above is considered not limited to only being applied to a system that uses a wireless transmission channel in part of the transmission channel. That is to say, the method mentioned above is considered to be able to be applied also to a system in which transmission devices connected via a transmission channel (that corresponds to the above wireless transmission channel) between the transmission devices (that correspond to the above transmission devices) transmit signals of the plurality of wired transmission channels connected to the respective transmission devices.

PRIOR ART DOCUMENT

Patent Document

[Patent Document 1] Japanese Unexamined Patent Application, First Publication No. 2006-067239

SUMMARY OF THE INVENTION

Problem to be Solved by the Invention

However, up until now, there has been proposed no mechanism for performing failure notification between a plurality of wireless transmission channels. For this reason, in a system in which a first transmission device and a second transmission device are connected via wireless transmission channels to a transmission device capable of housing a plurality of wireless transmission channels, the second transmission device has been unable to receive a failure notification when the first transmission device detects a failure. Accordingly, the second transmission device has been unable to perform control according to the failure detected by the first transmission device.

The present invention takes the above circumstances into consideration. An exemplary object of the present invention is to provide a technique that enables notification of a failure between transmission devices connected to each other via wireless transmission channels.

Means for Solving the Problem

A wireless transmission device according to one exemplary aspect of the present invention houses a plurality of wireless transmission channels including a first and a second wireless transmission channel. The wireless transmission device includes: a wireless signal transmitting and receiving unit that includes a first wireless port and a second port, the first wireless port transmitting and receiving a wireless signal to and from a first transmission device via the first wireless transmission channel, the second wireless port transmitting and receiving a wireless signal to and from a second transmission device via the second wireless transmission channel; and a control unit that notifies the second transmission device of a failure via the second wireless transmission channel in a case where a failure relating to the first wireless port arises.

A failure information forwarding method according to one exemplary aspect of the present invention is for a wireless transmission device transmitting and receiving a wireless signal to and from a first transmission device via a first wireless transmission channel, and transmitting and receiving a wireless signal to and from a second transmission device via a second wireless transmission channel. The failure information forwarding method includes: receiving failure information from the first transmission device via the first wireless transmission channel; and forwarding the failure information to the second transmission device via the second wireless transmission channel upon receiving the failure information.

A failure information notification method according to one exemplary aspect of the present invention notifies of failure information from a first wireless transmission device connected to a plurality of wired transmission channels and a plurality of wireless transmission channels, the first wireless transmission device performing wireless communication via the plurality of wired transmission channels. The failure information notification method includes: detecting a failure in a signal received from each of the plurality of wired transmission channels and the plurality of wireless transmission channels; and notifying a second wireless transmission device of information via a wireless transmission channel upon detecting a failure in any one of the plurality of wired transmission channels and the plurality of wireless transmission channels, the information being related to the failure, the wireless transmission channel being one of the plurality of wireless transmission channels in which no failure is detected.

Effect of the Invention

With the present invention, in a system in which a first transmission device and a second transmission device are connected via wireless transmission channels to a transmission device capable of housing a plurality of wireless transmission channels, the second transmission device can be notified of a failure detected by the first transmission device.

EMBODIMENTS FOR CARRYING OUT THE INVENTION

[System Overview]

Figure 1:
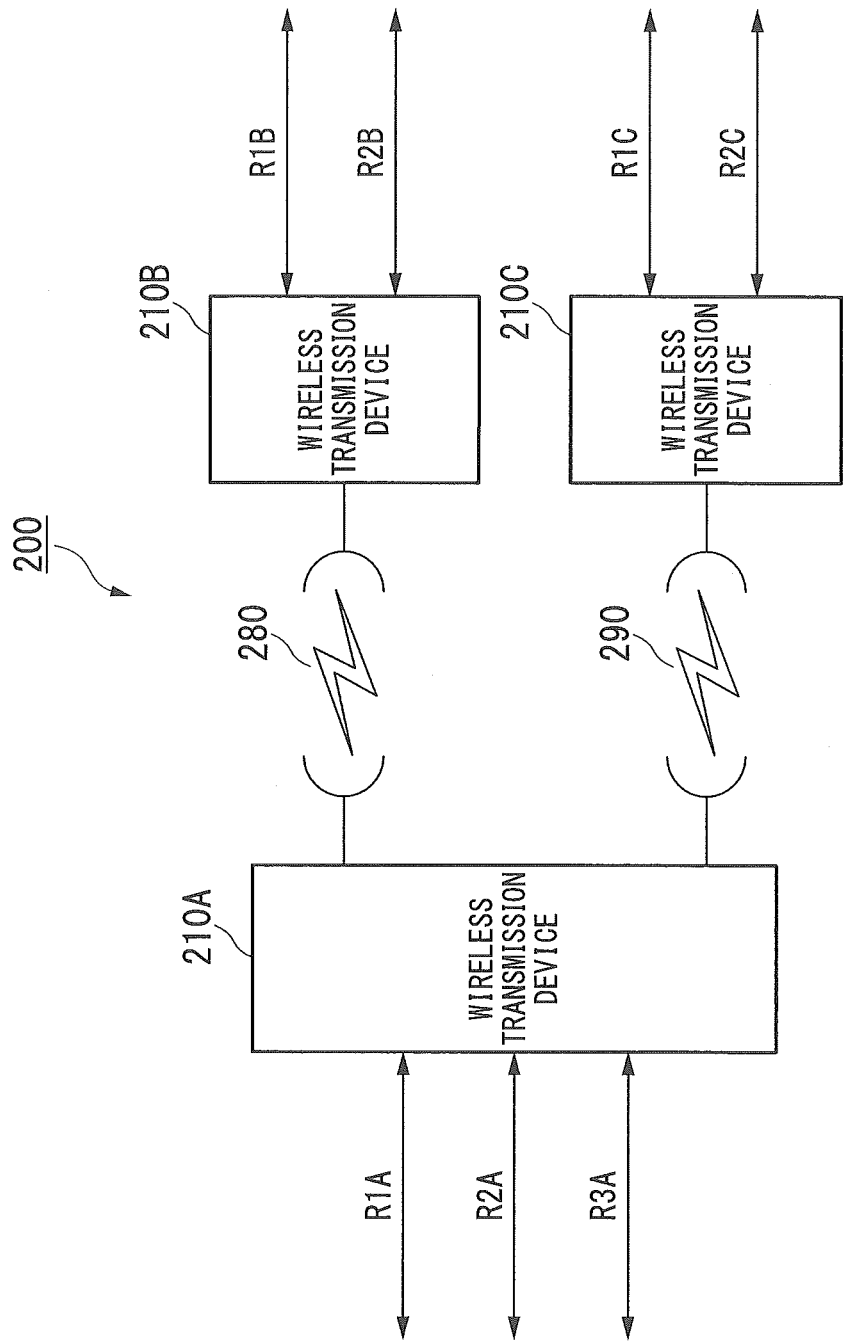
FIG. 1 is a system configuration diagram showing a system configuration of a transmission system according to an exemplary embodiment of the present invention.

FIG. 1 is a system configuration diagram showing a system configuration of a transmission system 200 according to an exemplary embodiment of the present invention. The transmission system 200 includes a plurality of wireless transmission devices. In the example of FIG. 1, the transmission system 200 includes three wireless transmission devices 210 (210A, 210B, 210C). The wireless transmission device 210A is connected to one or more (three in the example of FIG. 1) wired transmission channels R1A, R2A, and R3A. The wireless transmission device 210B is connected to one or more (two in the example of FIG. 1) wired transmission channels R1B and R2B. The wireless transmission device 210C is connected to one or more (two in the example of FIG. 1) wired transmission channels R1C and R2C. The wireless transmission device 210A and the wireless transmission device 210B are opposed to each other and are connected to each other by a wireless transmission channel 280. The wireless transmission device 210A and the wireless transmission device 210C are opposingly connected to each other by a wireless transmission channel 290. Each wired transmission channel is connected to a LAN (local area network) device (network device) not shown in the figure such as a hub, a switching hub, a router, and a computer terminal.

Next are described communications made toward the wireless transmission devices 210B and 210C from the wireless transmission device 210A.

The wireless transmission device 210A converts LAN data from a network device (not shown in the figure) connected via the wired transmission channels R1A, R2A, and R3A, into a wireless signal. The wireless transmission device 210A outputs the wireless signal to wireless transmission channels 280 and 290, and transmits it to each of the wireless transmission device 210B and the wireless transmission device 210C. The wireless transmission device 210B converts the wireless signal transmitted from the wireless transmission device 210A via the wireless transmission channel 280 into LAN data. The wireless transmission device 210B outputs the LAN data to a wired transmission channel, which corresponds to a transmission destination, among the wired transmission channels R1B and R2B, and transmits it to a network device connected to the wired transmission channel. The wireless transmission device 210C converts the wireless signal transmitted from the wireless transmission device 210A via the wireless transmission channel 290 into LAN data. The wireless transmission device 210C outputs the LAN data to a wired transmission channel, which corresponds to a transmission destination, among the wired transmission channels R1C and R2C, and transmits it to a network device connected to the wired transmission channel.

If necessary, as described later, the wireless transmission device 210A transmits the wireless signal transmitted from the wireless transmission device 210B (wireless transmission device 210C) directly to the other wireless transmission device 210C (wireless transmission device 210B). Moreover, if necessary, as described later, the wireless transmission device 210A converts the wireless signal transmitted from the wireless transmission device 210B (wireless transmission device 210C) into LAN data and transmits it to the wired transmission channel R1A (R2A, R3A).

Next are described communications made toward the wireless transmission device 210A from the wireless transmission device 210B.

The wireless transmission device 210B converts LAN data from a network device connected via the wired transmission channel R1B or R2B, into a wireless signal. The wireless transmission device 210B outputs the wireless signal to the wireless transmission channel 280 and transmits it to the transmission device 210A. The wireless transmission device 210A converts the wireless signal transmitted from the wireless transmission device 210B via the wireless transmission channel 280, into LAN data. The wireless transmission device 210A outputs the LAN data to a wired transmission channel, which corresponds to a transmission destination, among the wired transmission channels R1A, R2A, and R3A, and transmits it to a network device connected to the wired transmission channel. Moreover, if necessary, the wireless transmission device 210A transmits the wireless signal as it is to the wireless transmission device 210C via the other wireless transmission channel 290.

Next are described communications made toward the wireless transmission device 210A from the wireless transmission device 210C.

The wireless transmission device 210C converts LAN data from a network device connected via the wired transmission channel R1C or R2C, into a wireless signal. The wireless transmission device 210C outputs the wireless signal to the wireless transmission channel 290 and transmits it to the transmission device 210A. The wireless transmission device 210A converts the wireless signal transmitted from the wireless transmission device 210C via the wireless transmission channel 290, into LAN data. The wireless transmission device 210A outputs the LAN data to a wired transmission channel, which corresponds to a transmission destination, among the wired transmission channels R1A, R2A, and R3A, and transmits it to a network device connected to the wired transmission channel. Moreover, the wireless transmission device 210A transmits the wireless signal as it is to the wireless transmission device 210B via the other wireless transmission channel 280.

Next, failure notification is described. The wireless transmission devices 210 (210A through 210C) detect a failure in the wired transmission channels or wireless transmission channels connected to the wireless transmission devices themselves. When a failure is detected, the wireless transmission devices 210 cut wired transmission channels and perform failure notification to opposing wireless transmission devices.

When a failure notification is received from an opposing wireless transmission device, the wireless transmission devices 210 cut the wired transmission channel connected thereto, and perform failure notification to opposing wireless transmission devices that have not received the failure.

[Device Details]

Next, details of the configuration of the wireless transmission devices 210 are described. The wireless transmission device 210A, the wireless transmission device 210B, and the wireless transmission device 210C respectively have a similar configuration. Accordingly, the wireless transmission devices 210 are described in detail, taking the wireless transmission device 210A as an example.

In the following description, alphabetic reference symbols are given to respective signals and information in order to facilitate comparison between illustrations in the figures and descriptions in this text. For example, LAN received data is referred to as "LAN reception data DLS".

Figure 2:
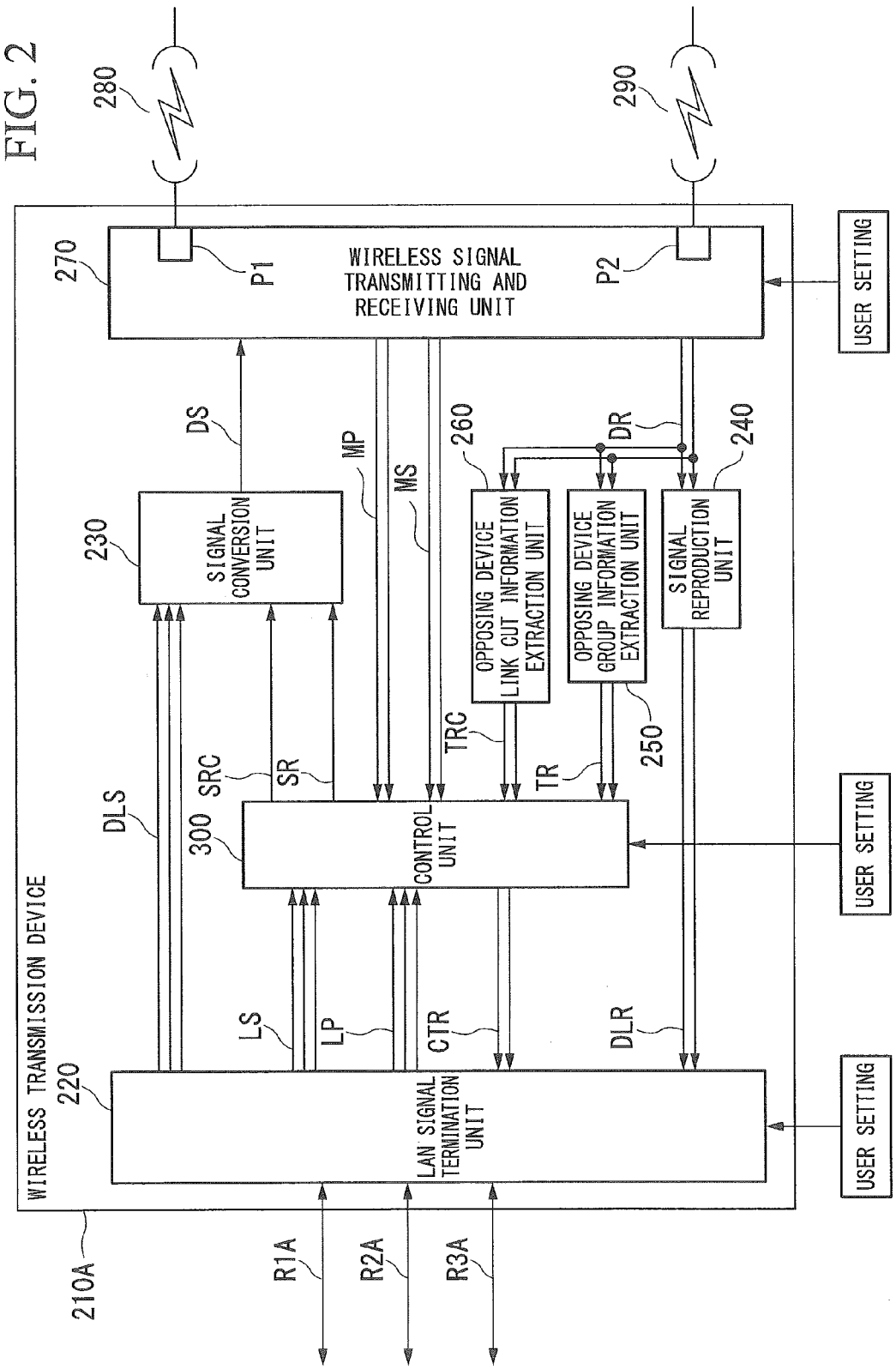
FIG. 2 is a schematic block diagram showing a function configuration of a transmission device shown in FIG. 1.

FIG. 2 is a schematic block diagram showing a function configuration of the transmission device 210A. The transmission device 210A includes a LAN signal termination unit 220, a signal conversion unit 230, a signal reproduction unit 240, an opposing device group information extraction unit 250, an opposing device link cut information extraction unit 260, a wireless signal transmitting and receiving unit 270, and a control unit 300.

The LAN signal termination unit 220 transmits/receives a LAN signal (LAN data signal) via the wired transmission channels R1A, R2A, and R3A, and establishes a link on a data link layer between itself and network devices. The LAN signal termination unit 220 receives LAN data from a network device via a wired transmission channel with an established link, and transmits LAN reception data DLS to the signal conversion unit 230.

The LAN signal termination unit 220 stores wired state information. The wired state information indicates, for each wired transmission channel, whether the wired transmission channel is in a state of being used or in a state of not being used in the device itself (wireless transmission device 210A). The administrator (user) of the transmission system 200 can arbitrarily set wired state information of each wired transmission channel (wired port) on the wireless transmission device 210A side, to the "used" state or "not used" state. In the figure, information set by the administrator is referred to as "user setting". The LAN signal termination unit 220 outputs LAN port information LP, which indicates either "used" or "not used" wired state information set for each wired transmission channel, to the control unit 300. In the following description, there is described a case where all of 210A side wired transmission channels (R1A, R2A, and R3A) are set to "used".

The LAN signal termination unit 220 monitors the failure state of the wired transmission channels. For the wired transmission channel (R1A through R3A) in which a failure has occurred, the LAN signal termination unit 220 outputs to the control unit 300 failure information LS that indicates a failure has occurred. A state where "a failure has occurred in a wired transmission channel" is, for example, a state described below. A first example of this state is a state where no link has been established with a network device connected to the wired transmission channel although it is set to "used" state. A second example of this state is a state where the LAN data received via the wired transmission channel is abnormal data although it is set to "used" state". The state where "a failure has occurred in a wired transmission channel" may also be another abnormal state.

The LAN signal termination unit 220 receives LAN transmission data DLR from the signal reproduction unit 240. The LAN signal termination unit 220 transmits the LAN transmission data DLR to a network device via a wired transmission channel with an established link.

The LAN signal termination unit 220 monitors a link cut control signal CTR, which is described later, output from the control unit 300. While a link cut control signal CTR is being detected, the LAN signal termination unit 220 cuts the wired transmission channel indicated by the link cut control signal CTR. "Cutting a wired transmission channel" means the LAN signal termination unit 220 cutting the link with the network device connected to the wired transmission channel.

The signal conversion unit 230 multiplexes the LAN reception data DLS received from the LAN signal termination unit 220, and self device group information SR and link cut information SRC received from the control unit 300, and generates transmission data DS. The signal conversion unit 230 outputs the generated transmission data DS to the wireless signal transmitting and receiving unit 270.

The signal reproduction unit 240 receives reception data DR from the wireless signal transmitting and receiving unit 270, and extracts a LAN signal from the reception data DR. The signal reproduction unit 240 then converts the extracted LAN signal into LAN transmission data DLR and outputs it to the LAN signal termination unit 220. As described later, the reception data DR is the data that is received by another wireless transmission device 210 (210B or 210C), and that is received by the wireless signal transmitting and receiving unit 270.

The opposing device group information extraction unit 250 receives the reception data DR from the wireless signal transmitting and receiving unit 270, and extracts from the reception data DR, group information TR of the wireless transmission device (210B or 210C) of the transmission source. The opposing device group information extraction unit 250 outputs the extracted group information TR to the control unit 300. The group information TR of the wireless transmission device 210B (210C) is self device group information SR for the transmission device 210B (210C). Group information TR is referred to as "opposing device group information TR" in order to distinguish the self device group information SR of the wireless transmission device 210A from the group information TR.

The opposing device link cut information extraction unit 260 receives the reception data DR from the wireless signal transmitting and receiving unit 270, and extracts from the reception data DR, link cut information TRC of the wireless transmission device (210B or 210C) of the transmission source. The opposing device link cut information extraction unit 260 outputs the extracted link cut information TRC to the control unit 300. In order to distinguish link cut information SRC of the self device (wireless transmission device 210A) from link cut information of the wireless transmission device 210B (210C), link cut information (link cut information extracted from the reception data DR) TRC on the transmission device 210B side is referred to as "opposing device link cut information TRC".

The wireless signal transmitting and receiving unit 270, includes a wireless port for each wireless transmission channel. In the present exemplary embodiment, the wireless signal transmitting and receiving unit 270 includes wireless ports P1 and P2 respectively for the wireless transmission channel 280 and the wireless transmission channel 290. The wireless signal transmitting and receiving unit 270 converts transmission data DS transmitted from the signal conversion unit 230 into a wireless signal. The wireless ports P1 and P2 of the wireless signal transmitting and receiving unit 270 output the wireless signal respectively to the wireless transmission device 210B and the wireless transmission device 210C via the wireless transmission channel 280 and the wireless transmission channel 290. Moreover, the wireless ports P1 and P2 of the wireless signal transmitting and receiving unit 270 receive the wireless signal from the wireless transmission device 210B and the wireless transmission device 210C via the wireless transmission channel 280 and the wireless transmission channel 290. The wireless signal receiving unit 270 outputs the received wireless signal as reception data DR to the signal reproduction unit 240, the opposing device group information extraction unit 250, and the opposing device link cut information extraction unit 260.

The wireless signal transmitting and receiving unit 270 stores wireless state information. The wireless state information indicates, for each wireless transmission channel, whether the wireless transmission channel is in a state of being used or in a state of not being used in the device itself (wireless transmission device 210A). The administrator of the transmission system 200 can arbitrarily set wireless state information of each wireless transmission channel (wireless port), to the "used" state or "not used" state. The wireless signal transmitting and receiving unit 270 outputs wireless port information MP, which indicates either "used" or "not used" wireless state information set for each wireless transmission channel, to the control unit 300. In the following description, there is described a case where all of the wireless transmission channels (280 and 290) are set to "used".

The wireless signal transmitting and receiving unit 270 monitors the failure state of the wireless transmission channels. When a failure occurs, the wireless signal transmitting and receiving unit 270 generates wireless section failure information MS and outputs it to the control unit 300. Examples of the state where "a failure has occurred in the wireless transmission channel 280 (290)" include a state where the wireless transmission channel 280 (290) is cut, and a state where the wireless signal received from the wireless transmission channel 280 (290) is abnormal.

The control unit 300 receives LAN port information LP and failure information LS from the LAN signal termination unit 220. The control unit 300 receives from the wireless signal transmitting and receiving unit 270 the wireless port information MP and the wireless section failure information MS. The control unit 300 receives from the opposing device group information extraction unit 250 the opposing device group information TR. The control unit 300 receives from the opposing device link cut information extraction unit 260 the opposing device link cut information TRC. The control unit 300 outputs to the signal conversion unit 230 the self device group information SR and the link cut information SRC. The control unit 300 outputs to the LAN signal termination unit 220 a link cut control signal CTR.

Figure 3:
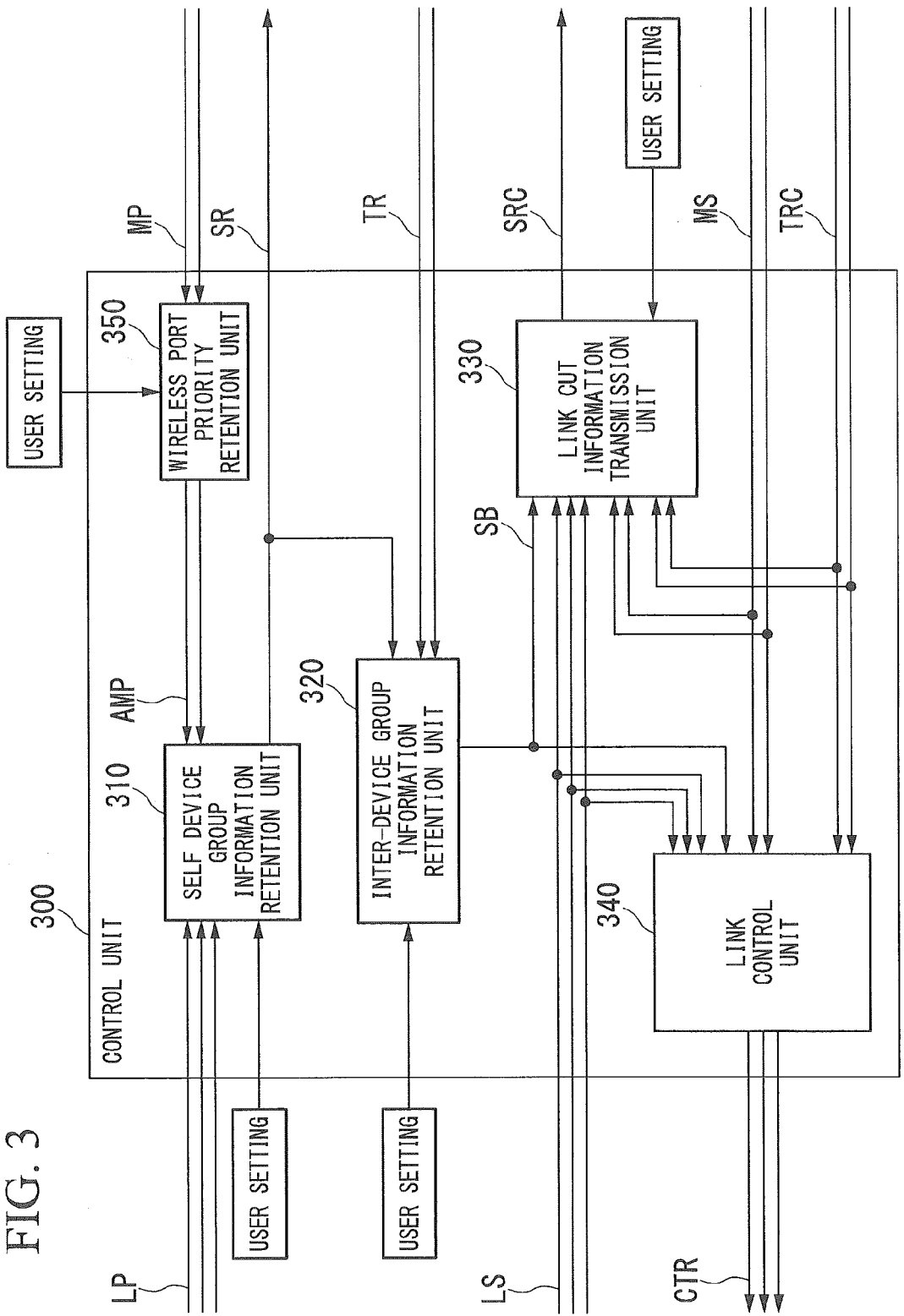
FIG. 3 is a schematic block diagram showing a function configuration of a control unit shown in FIG. 2.

Next, the configuration of the control unit 300 is described in more detail. FIG. 3 is a schematic block diagram showing a function configuration of the control unit 300. The control unit 300 includes a self device group information retention unit 310, an inter-device group information retention unit 320, a link cut information transmitting unit 330, a link control unit 340, and a wireless port priority retention unit 350.

The self device group information retention unit 310 receives input of LAN port information LP and prioritized wireless port information AMP. The self device group information retention unit 310 generates self device group information SR based on the LAN port information LP and the prioritized wireless port information AMP. The self device group information retention unit 310 retains the generated self device group information SR.

The self device group information SR indicates corresponding relationships between the wired transmission channels (R1A, R2A, and R3A) and the wireless transmission channels (280 and 290) in the "used" state that are connected to the self device (wireless transmission device 210A), and the link groups to which the wired transmission channels and the wireless transmission channels belong. A single link group is configured in combination with a wired transmission channel or a wireless transmission channel in the "used" state that is connected to the self device (wireless transmission device 210A). Basically, a single wired transmission channel (wired port) belongs to a single link group. A single wireless transmission channel (wireless port) may belong to a plurality of link groups. This self device group information SR can be arbitrarily set by the administrator. The self device group information retention unit 310 generates self device group information SR based on the LAN port information LP, the prioritized wireless port information AMP, and the setting performed by the administrator, and retains it. The self device group information retention unit 310 outputs the retained self device group information SR to the inter-device group information retention unit 320 and the signal conversion unit 230.

The inter-device group information retention unit 320 receives an input of the opposing device group information TR from the opposing device group information extraction unit 250. The inter-device group information retention unit 320 receives an input of the self device group information SR from the self device group information retention unit 310. The inter-device group information retention unit 320 generates inter-device group information SB based on the opposing device group information TR and the self device group information SR. The inter-device group information retention unit 320 retains the generated inter-device group information SB. The inter-device group information retention unit 320 outputs the inter-device group information SB to the link cut information transmitting unit 330 and the link control unit 340.

The inter-device group information SB indicates a corresponding relationship between the link group indicated by the self device group information SR and each link group indicated by the opposing device group information TR. The inter-device group information retention unit 320 generates the inter-device group information SB according to the setting of the administrator.

The link cut information transmitting unit 330 generates link cut information SRC based on the failure information of the wired transmission channel in the "used" state on the self device (wireless transmission device 210A) side, and the failure information of the opposing device received from the opposing device. The link cut information transmitting unit 330 outputs the generated link cut information SRC to the signal conversion unit 230. The link cut information SRC is then transmitted by the signal conversion unit 230 and the wireless signal transmitting and receiving unit 270 to the wireless transmission device 210B (210C) via the wireless transmission channel 280 (290). The link cut information transmitting unit 330 may generate and output link cut information SRC, for example, at predetermined intervals (for example, every 10 seconds). The link cut information transmitting unit 330 may generate and output link cut information SRC, for example, when the content of failure information changes. The timing at which the link cut information transmitting unit 330 generates and outputs link cut information SRC is not limited to the above timings and may be another timing.

The link cut information transmitting unit 330 generates link cut information SRC based on the failure information LS received from the LAN signal termination unit 220, the wireless section failure information MS, and the opposing device link cut information TRC, and on a failure notification policy set by the administrator. The failure notification policy may, for example, be a policy described below. A first example of the failure notification policy is a policy (first policy) such that as long as a failure occurs in at least one wired transmission channel among the wired transmission channels that belong to the same link group, failure information LS is generated for the link group. A second example of the failure notification policy is a policy (second policy) such that if a failure occurs in all of the wired transmission channels that belong to the same link group, failure information LS is generated for the link group. A third example of the failure notification policy is a policy (third policy) such that failure information of the opposing station received via one wireless transmission channel that belongs to the same link group is forwarded to the opposing station that is connected via the other wireless transmission channel. The failure notification policy may be set in another manner.

In the present exemplary embodiment, the following two examples of the failure notification policy are described. That is to say, the first example is a policy (second policy) such that if a failure occurs in all of the wired transmission channels that belong to the same link group, failure information LS is generated for the link group. The second example is a policy (third policy) such that failure information of the opposing station received via one wireless transmission channel that belongs to the same link group is forwarded to the opposing station that is connected via the other wireless transmission channel.

The link cut information transmitting unit 330 receives an input of wireless section failure information MS from the wireless signal transmitting and receiving unit 270. The link cut information transmitting unit 330 receives an input of the inter-device group information SB from the inter-device group information retention unit 320. If an input of the wireless section failure information MS is received, the link cut information transmitting unit 330 generates link cut information SRC based on the wireless section failure information MS and the inter-device group information SB. The link cut information transmitting unit 330 outputs the generated link cut information SRC to the signal conversion unit 230. On the other hand, if an input of wireless section failure information MS is not received, the link cut information transmitting unit 330 does not generate nor output link cut information SRC.

In the present exemplary embodiment, the administrator can set whether or not to output link cut information SRC. Hereunder, there is described a case where it is set that an output of link cut information SRC is "conducted".

When a failure occurs in any one of the wired transmission channels R1A, R2A, and R3A, the link control unit 340 cuts the wired transmission channel. Moreover, when a failure occurs in either one of the wireless transmission channels 280 and 290, the link control unit 340 cuts the wired transmission channel. Furthermore, when opposing device link cut information TRC is received from either one of the wireless transmission devices 210B and 210C, the link control unit 340 cuts the wired transmission channel.

If several wireless transmission channels belong to a single link group, the link control unit 340 cuts the wired transmission channel according to a wireless port priority policy.

The wireless port priority retention unit 350 receives an input of wireless port information MP from the wireless signal transmitting and receiving unit 270. The wireless port priority retention unit 350 generates and stores the prioritized wireless port information AMP based on the wireless port priority policy set by the administrator and the wireless port information MP. The wireless port priority retention unit 350 outputs the stored prioritized wireless port information AMP to the self device group information retention unit 310.

The wireless port priority policy expresses a wireless port priority as either "high" or "low" as an example. The wireless port priority policy is, for example, a policy described below. A first example of the wireless port priority policy is a policy such that the failure notification is forwarded to the wireless port with a "low" priority if a failure has occurred on the wireless port with a "high" priority that belongs to the same link group. A second example of the wireless port priority policy is a policy such that the failure notification is not forwarded to the wireless port with a "low" priority if a failure has occurred on the wireless port with a "high" priority that belongs to the same link group. A third example of the wireless port priority policy is a policy such that if a failure has occurred in all of the wireless ports with a "high" priority that belong to the same link group, all of the wired transmission channels included in the link group are cut. A fourth example of the wireless port priority policy is a policy such that if a failure has occurred in all of the wireless ports with a "low" priority that belong to the same link group, all of the wired transmission channels included in the link group are cut.

The wireless port priority policy may be a combination of these, and it may be set in another way.

In the transmission system 200 configured in this manner, in a state where a plurality of wireless transmission channels belong to the same link group, when a failure occurs in one wireless transmission channel or a failure occurs in the wired transmission channel of the opposing device connected via a wireless transmission channel, failure information is notified to an opposing device via another wireless transmission channel. As a result, it is possible in the opposing device of the other wireless transmission channel to receive failure information and perform control based on the failure information.

The following is a more detailed description of this. The opposing device link cut information extraction unit 260 outputs the opposing station link cut information TRC extracted from the reception data DR not only to the link control unit 340 but also to the link cut information transmitting unit 330. Moreover, the wireless signal transmitting and receiving unit 270 transmits the wireless section failure information MS of the wireless transmission channels (280 and 290) not only to the link control unit 340 but also to the link cut information transmitting unit 330. In this manner, the link cut information transmitting unit 330 receives inputs of the opposing device link cut information TRC and the wireless section failure information MS. As a result, the failure information of the opposing station received via one wireless transmission channel that belongs to the same link group can be forwarded to the opposing station that is connected via another wireless transmission channel. Moreover, the failure information of one wireless transmission channel that belongs to a given link group can also be forwarded to the opposing station that is connected via another wireless transmission channel.

Furthermore, in a state where a plurality of wireless transmission channels belong to the same link group, a priority can be arbitrarily set to an individual wireless transmission channel. As a result, when a failure occurs in any one of the wireless transmission channels that belong to the same link group, the presence or absence of failure information notification is different according to the priority set to the wireless transmission channel (for example, FIG. 6 and FIG. 7 described later). Therefore, also in the same link group, failure information notification can be made in asymmetric directions.

That is to say, in a state where a plurality of wireless transmission channels belong to the same link group, it is possible to make a failure information notification via a wireless transmission channel to a wireless transmission device with no failure occurring therein, without influencing another wired transmission channel or a wireless transmission channel transmitting non-correlated signals. The "non-correlated signals" above refer to signals that need to be transmitted via one wireless transmission channel among several wireless transmission channels belonging to the same link group, but that do not need to be transmitted via another wireless transmission channel. For example, the combination of ports used for communications in the wireless transmission device 210A differs for a signal relayed from the wired transmission channel R1A via the wireless transmission device 210A to the wireless transmission channel 280, a signal relayed from the wired transmission channel R3A via the wireless transmission device 210A to the wireless transmission channel 290, and a signal relayed from the wireless transmission channel 280 via the wireless transmission device 210A to the wireless transmission channel 290. Accordingly, each signal of the above three examples corresponds to a "non-correlated signal" to each other.

APPLICATION EXAMPLES

Next are described examples of operations in those cases where various types of setting are applied to the transmission system 200. In a first application example through a fourth application example, there are described examples of cases where a plurality of wired transmission channels and wireless transmission channels are set within a single link group. On the other hand, in a fifth application example and a sixth application example, there are described examples of cases where wired transmission channels and a plurality of wireless transmission channels do not coexist and only a plurality of wireless transmission channels are set within a single link group.

First Application Example

Figure 4:
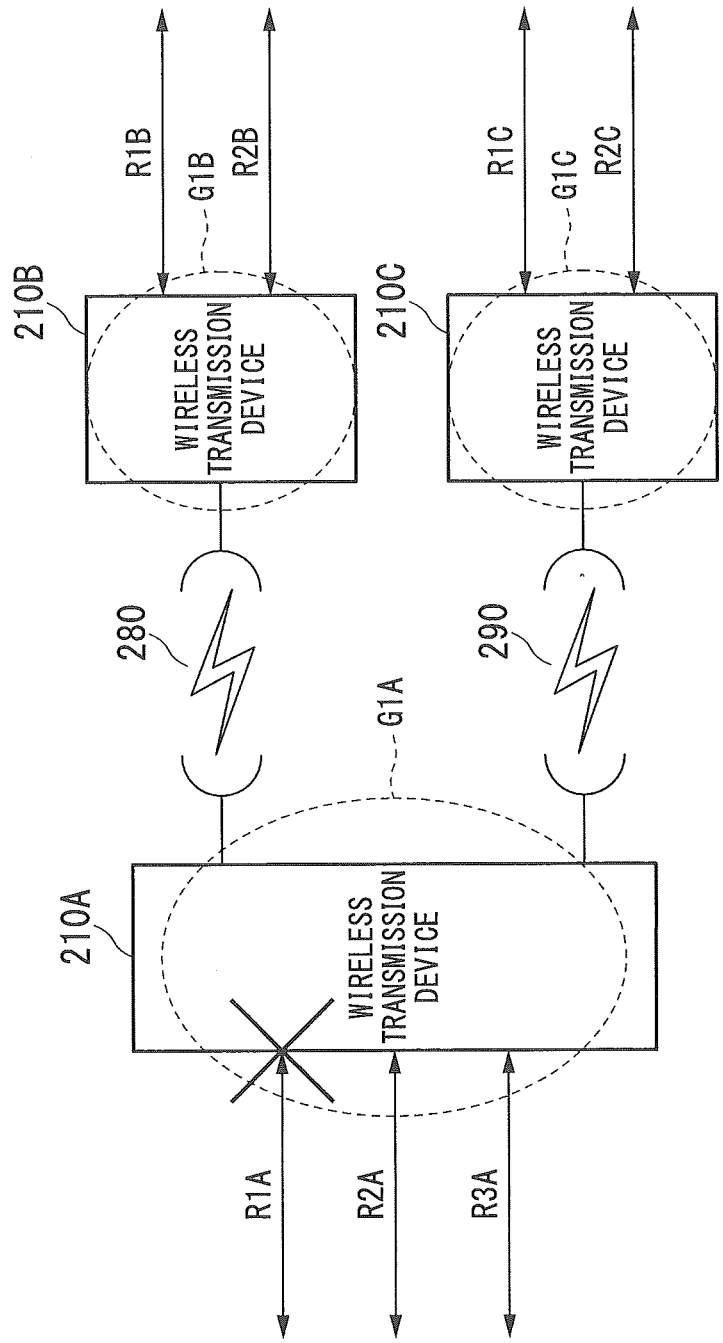
FIG. 4 is a diagram showing an overview of a transmission system in a first application example according to the exemplary embodiment of the present invention.

FIG. 4 is a diagram showing an overview of the transmission system 200 in a first application example. In FIG. 4 (and FIG. 5 through FIG. 9, and FIG. 13), the wired transmission channels and wireless transmission channels surrounded by the same dashed-line circle belong to the same link group. The large symbol "x" illustrated with solid lines illustrates that a detection of a failure in the transmission channel is made. The small symbol "x" illustrated with dashed-lines illustrates that it has been cut according to opposing device link cut information TRC.

In the first application example, all of the wired transmission channels R1A, R2A, and R3A on the wireless transmission device 210A side and all of the wireless transmission channels 280 and 290 belong to a link group G1A. All of the wired transmission channels R1B and R2B on the wireless transmission device 210B side and the wireless transmission channel 280 belong to a link group G1B. All of the wired transmission channels R1C and R2C on the wireless transmission device 210C side and the wireless transmission channel 290 belong to a link group G1C. The link group G1A and the link group G1B are associated with each other, and the link group G1A and the link group G1C are associated with each other.

As shown in FIG. 4, a failure is detected in the wired transmission channel R1A that belongs to the link group G1A. However, there is no failure occurring in the other wired transmission channels (R2A and R3A) that belong to the link group G1A, and a link is established in the other wired transmission channels. Therefore, a failure is not occurring in all of the wired transmission channels that belong to the same link group, and the second policy above is not satisfied. Accordingly, the wireless transmission device 210A does not generate link cut information SRC for the wired transmission channel in the self device.

There is no failure occurring in neither of the wired transmission channels R1B and R2B of the wireless transmission device 210B. Also, there is no failure occurring in neither of the wired transmission channels R1C and R2C of the wireless transmission device 210C. Accordingly, the wireless transmission device 210A does not detect opposing device link cut information TRC from the wireless transmission device 210B and the wireless transmission device 210C.

There is no failure occurring in neither of the wireless transmission channels 280 and 290 that are connected to the wireless transmission device 210A. Accordingly, the wireless transmission device 210A does not generate link cut information SRC for the wired transmission channel in the self device either.

As described above, the wireless transmission device 210A does not generate link cut information SRC for the wired transmission channels connected to the self device and the wireless transmission channels, and it does not receive opposing device link cut information TRC from the wireless transmission device 210B and the wireless transmission device 210C either. Accordingly, the wireless transmission device 210A does not transmit link cut information SRC to neither one of the wireless transmission device 210B and the wireless transmission device 210C.

As a result, even if there is a failure in the wired transmission channel R1A that belongs to the link group G1A, communications can still be made between the wired transmission channels R2A and R3A that belong to the same link group G1A, the wired transmission channels R1B and R2B that belong to the link group G1B, and the wired transmission channels R1C and R2C that belong to the link group G1C.

Second Application Example

Figure 5:
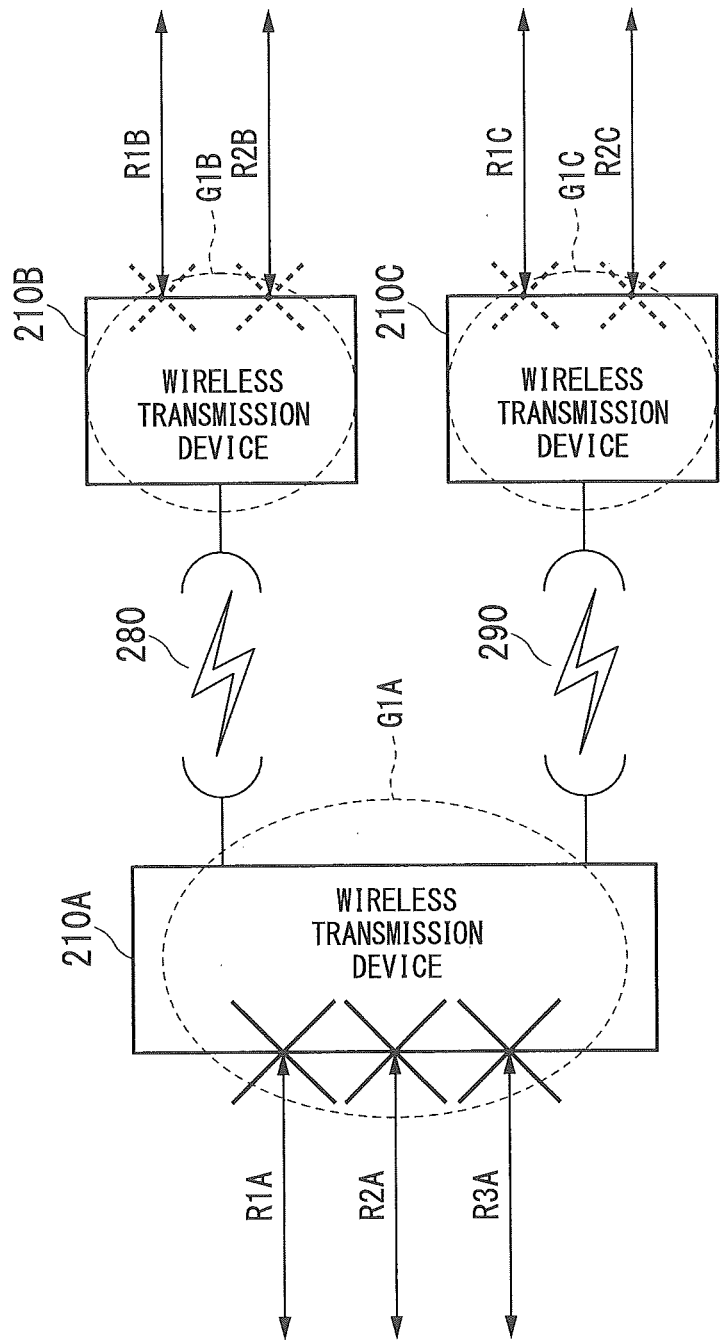
FIG. 5 is a diagram showing an overview of a transmission system in a second application example according to the exemplary embodiment.

FIG. 5 is a diagram showing an overview of the transmission system 200 in a second application example. The link group setting in the second application example is the same as that of the first application example. The second application example differs from the first application example in that a failure is detected in all of the wired transmission channels (R1A, R2A, and R3A) that belong to the link group G1A. In this case, the second policy above is satisfied. As a result, the wireless transmission device 210A generates link cut information SRC for the wired transmission channels of the link group G1A of the self device. The wireless transmission device 210A transmits the generated link cut information SRC to the wireless transmission device 210B and the wireless transmission device 210C.

The wireless transmission device 210B cuts all of the wired transmission channels (R1B and R2B) that belong to the link group G1B that corresponds to the link group G1A. Similarly, the wireless transmission device 210C cuts all of the wired transmission channels (R1C and R2C) that belong to the link group G1C that corresponds to the link group G1A.

Third Application Example

Figure 6:
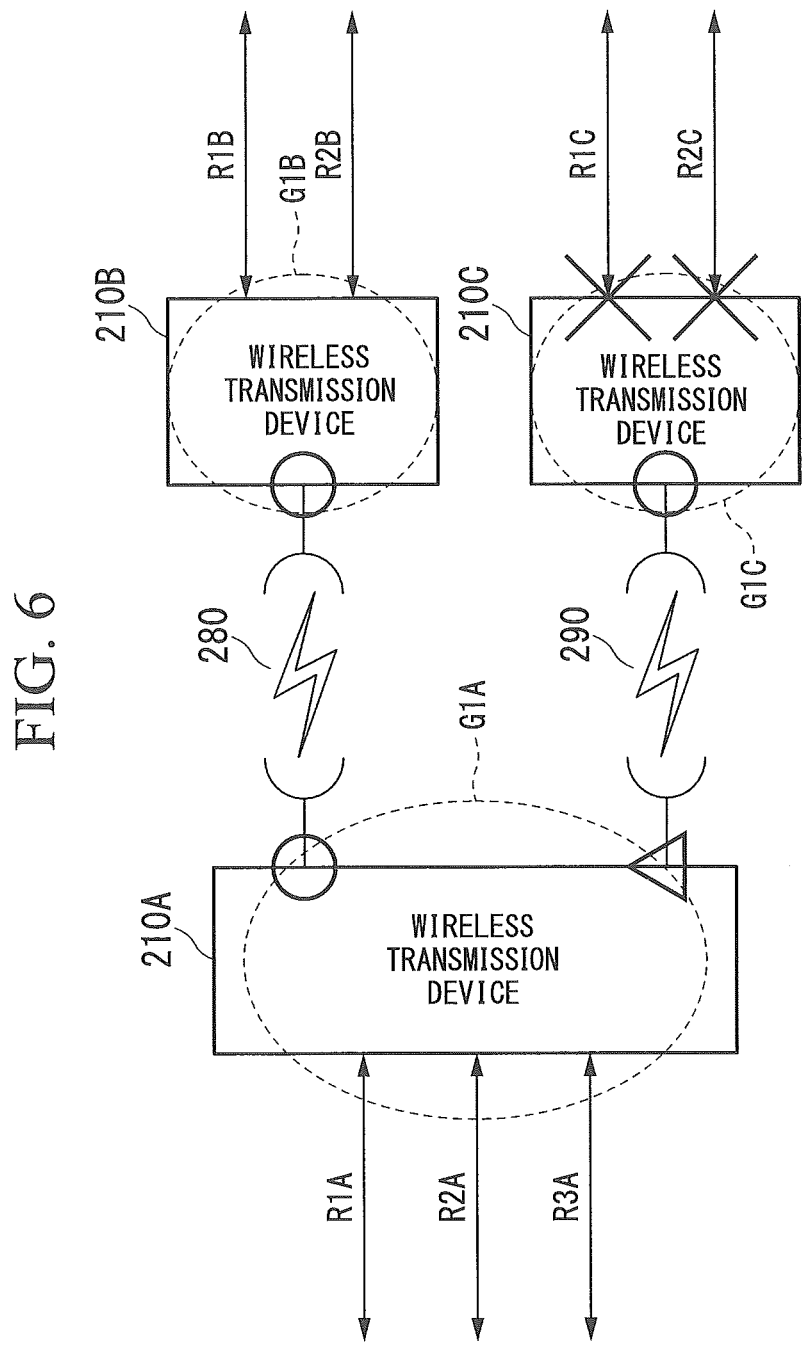
FIG. 6 is a diagram showing an overview of a transmission system in a third application example according to the exemplary embodiment.

FIG. 6 is a diagram showing an overview of the transmission system 200 in a third application example. In FIG. 6 (and FIG. 7 through FIG. 9, and FIG. 13), the circular and triangular symbols respectively illustrate priorities set by the wireless port priority retention unit 350. The circular symbol indicates that the priority is high. The triangular symbol indicates that the priority is low.

When opposing station link cut information TRC or wireless section failure information MS is detected at the wireless port where the priority is low (triangular symbol), the wireless transmission device 210A does not transmit link cut information SRC from the wireless port where the priority is high (circular symbol). The third application example is an example showing this type of operation.

The link group setting in the third application example is the same as that of the first application example. The priority of each wireless port in the third application example is as follows. The wireless port that is connected to the wireless transmission channel 280 among the wireless ports included in the link group G1A has its priority set high, and the wireless port that is connected to the wireless transmission channel 290 has its priority set low. Since only one wireless port is included in the link groups G1B and G1C respectively, the priorities thereof are set high respectively.

In the third application example, as shown in FIG. 6, a failure is detected in all of the wired transmission channels (R1C and R2C) that belong to the link group G1C in the wireless transmission device 210C.

The wireless transmission device 210A does not transmit link cut information SRC to the wireless port where the priority is high even if link cut information SRC is detected at the wireless port where the priority is low. Accordingly, link cut information SRC is not forwarded to the wireless transmission device 210B. Therefore, communications can be made between the wired transmission channels R1A, R2A, and R3A that belong to the link group G1A on the wireless transmission device 210A side, and the wired transmission channels R1B and R2B that belong to the link group G1B on the wireless transmission device 210B side.

Fourth Application Example

Figure 7:
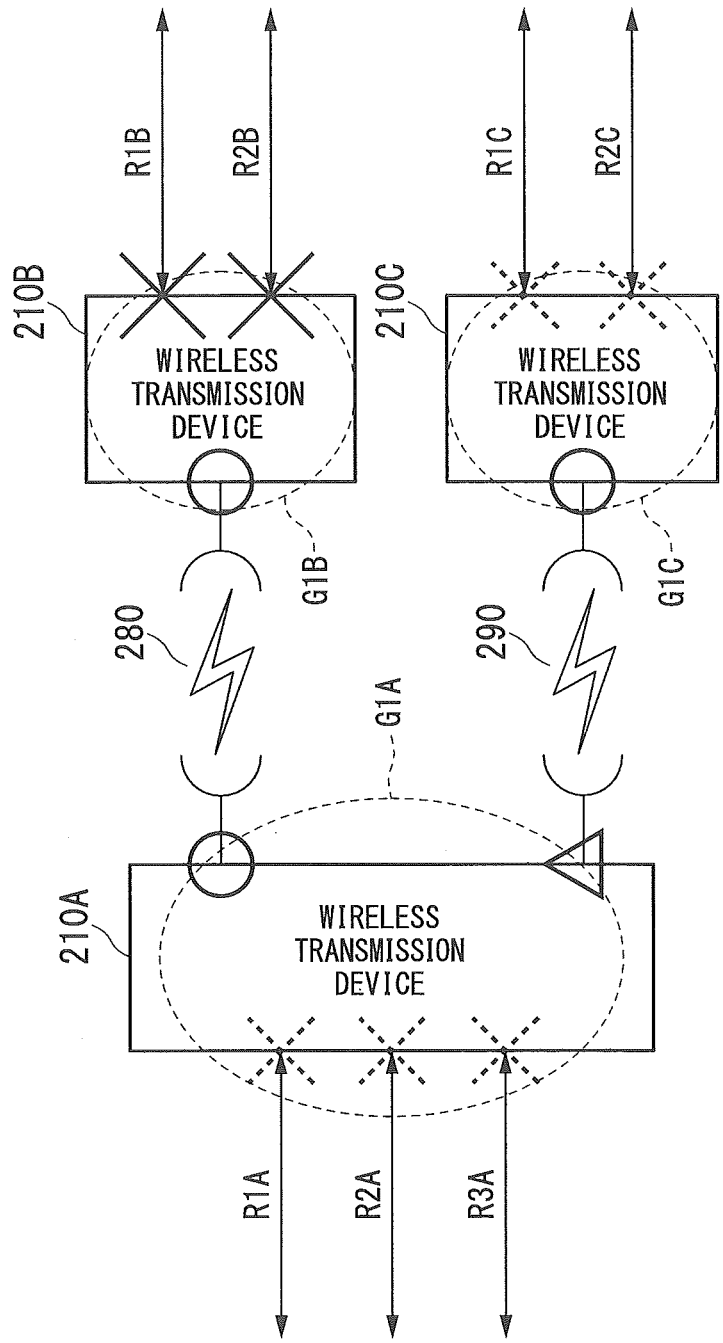
FIG. 7 is a diagram showing an overview of a transmission system in a fourth application example according to the exemplary embodiment.

FIG. 7 is a diagram showing an overview of the transmission system 200 in a fourth application example. When opposing station link cut information TRC or wireless section failure information MS is detected at the wireless port where the priority is high, the wireless transmission device 210A generates link cut information SRC. The wireless transmission device 210A transmits the generated link cut information SRC from the wireless port where the priority is low. The fourth application example is an example showing this type of operation.

The link group setting in the fourth application example is the same as that of the first application example. The priority of each wireless port in the fourth application example is the same as that of the third application example. In the third application example, a failure is detected in the wired transmission channels (R1C and R2C) that belong to the link group G1C. On the other hand, in the fourth application example, a failure is detected in the wired transmission channels (R1B and R2B) that belong to the link group G1B.

In the fourth application example, as shown in FIG. 7, a failure is detected in all of the wired transmission channels (R1B and R2B) that belong to the link group G1B in the wireless transmission device 210B.

The wireless transmission device 210A transmits link cut information SRC to the wireless port where the priority is low, since link cut information SRC is detected at the wireless port where the priority is high.

A process of transmitting link cut information SRC is described in detail, with reference to FIG. 2 and FIG. 3. First, the wireless signal transmitting and receiving unit 270 of the wireless transmission device 210A receives data including link cut information SRC from the wireless transmission channel 280. The opposing device link cut information extraction unit 260 extracts the link cut information SRC from the received data (reception data DR). The opposing device link cut information extraction unit 260 outputs the extracted link cut information SRC as opposing device link cut information TRC. The output opposing device link cut information TRC is input to the link cut information transmitting unit 330 of the control unit 300. The link cut information transmitting unit 330 determines to output the link cut information SRC from the wireless port where the priority is low, since the input opposing device link cut information TRC is the opposing device link cut information TRC that is received from the wireless port where the priority is high. Then, the link cut information transmitting unit 330 outputs the link cut information SRC. The signal conversion unit 230 converts the link cut information SRC output from the link cut information transmitting unit 330 of the control unit 300, and generates transmission data DS. The wireless signal transmitting and receiving unit 270 transmits the transmission data DS generated by the signal conversion unit 230 to the wireless transmission channel 290 from the wireless port where the priority is low.

By the operation described above, link cut information SRC is transmitted to the wireless transmission device 210C.

Eventually, in the fourth application example, communications cannot be made between the wired transmission channels R1A, R2A, and R3A that belong to the link group G1A on the wireless transmission device 210A side, and the wired transmission channels R1C and R2C that belong to the link group G1C on the wireless transmission device 210C side. That is to say, the wireless transmission device 210A cuts all of the wired transmission channels R1A, R2A, and R3A that belong to the same link group G1A as the wireless port connected to the wireless transmission channel 280 (wireless port where link cut information SRC is detected and the priority is high).

A process of cutting the wired transmission channels R1A through R3A is described in detail, with reference to FIG. 2 and FIG. 3. The process up to where opposing device link cut information TRC is input to the control unit 300 is as described above. The opposing device link cut information TRC is input to the link control unit 340 of the control unit 300. The link control unit 340 outputs a link cut control signal CTR since the input opposing device link cut information TRC is the opposing device link cut information TRC that is received from the wireless port where the priority is high. The LAN signal termination unit 320 cuts the wired transmission channels R1A through R3A based on the link cut control signal CTR output from the link control unit 340 of the control unit 300.

The wireless transmission device 210C that has received the link cut information SRC transmitted from the wireless transmission device 210A cuts all of the wired transmission channels R1C and R2C that belong to the same link group G1C as the wireless transmission channel 290 that has received the link cut information SRC.

Fifth Application Example

Figure 8:
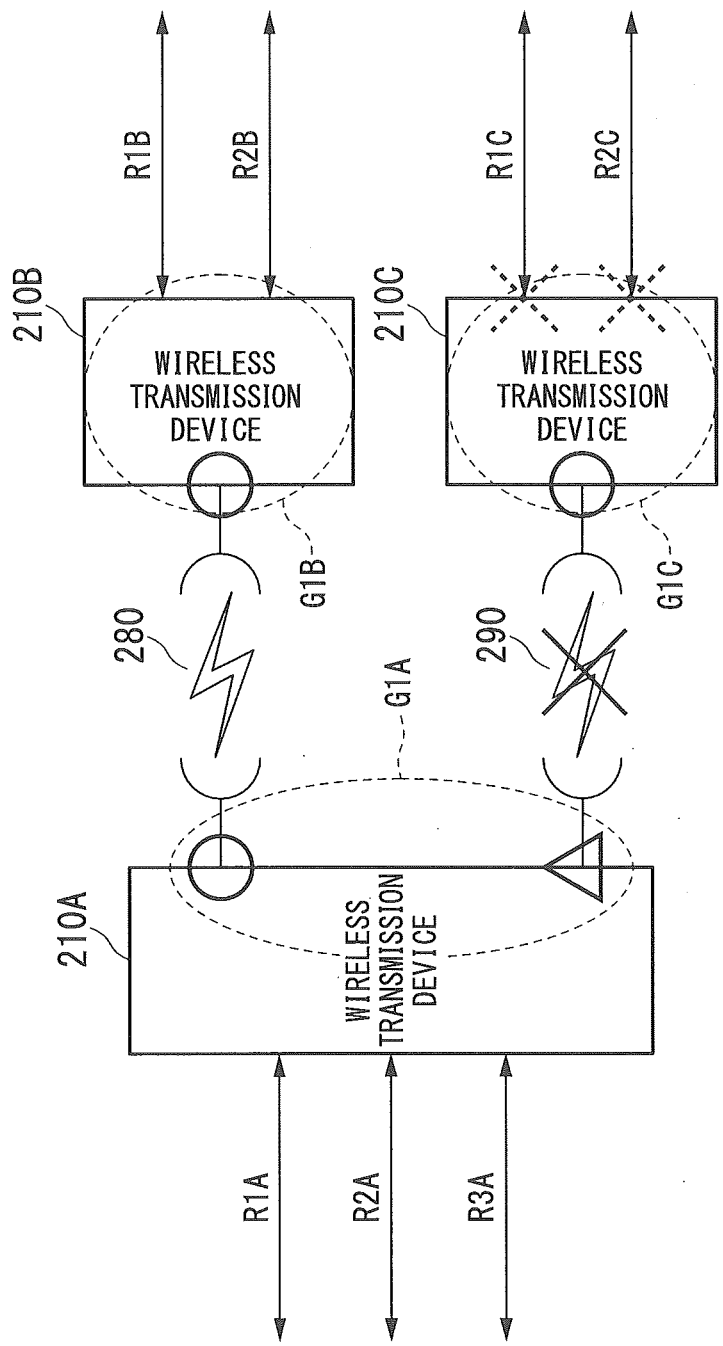
FIG. 8 is a diagram showing an overview of a transmission system in a fifth application example according to the exemplary embodiment.

FIG. 8 is a diagram showing an overview of the transmission system 200 in a fifth application example. When opposing station link cut information TRC or wireless section failure information MS is detected at the wireless port where the priority is low, the wireless transmission device 210A does not transmit link cut information SRC from the wireless port where the priority is high. The fifth application example is an example showing this type of operation.

The link group setting in the fifth application example is as follows. None of the wired transmission channels R1A, R2A, and R3A on the wireless transmission device 210A side belongs to the same link group as either of the wireless transmission channels (280 and 290). All of the wireless transmission channels 280 and 290 on the wireless transmission device 210A side belong to the link group G1A. All of the wired transmission channels R1B and R2B on the wireless transmission device 210B side and the wireless transmission channel 280 belong to a link group G1B. Moreover, all of the wired transmission channels R1C and R2C on the wireless transmission device 210C side and the wireless transmission channel 290 belong to a link group G1C. The link group G1A and the link group G1B are associated with each other. The link group G1A and the link group G1C are associated with each other. The priority of each wireless port in the fifth application example is the same as that of the third application example.

In the fifth application example, as shown in FIG. 8, a failure is detected in the wireless transmission channel 290 that connects the wireless transmission device 210A and the wireless transmission device 210C.

The wireless transmission device 210A does not transmit link cut information SRC to the wireless port where the priority is high even if link cut information SRC is detected at the wireless port where the priority is low. Accordingly, link cut information SRC is not forwarded to the wireless transmission device 210B. Therefore, communications can be made between the wired transmission channels R1A, R2A, and R3A that belong to the link group G1A on the wireless transmission device 210A side, and the wired transmission channels R1B and R2B that belong to the link group G1B on the wireless transmission device 210B side.

In the wireless transmission device 210C, link cut information SRC is detected at the wireless port. As a result, the wireless transmission device 210C cuts the wired transmission channels R1C and R2C that belong to the same link group G1C as this wireless port.

Sixth Application Example

Figure 9:
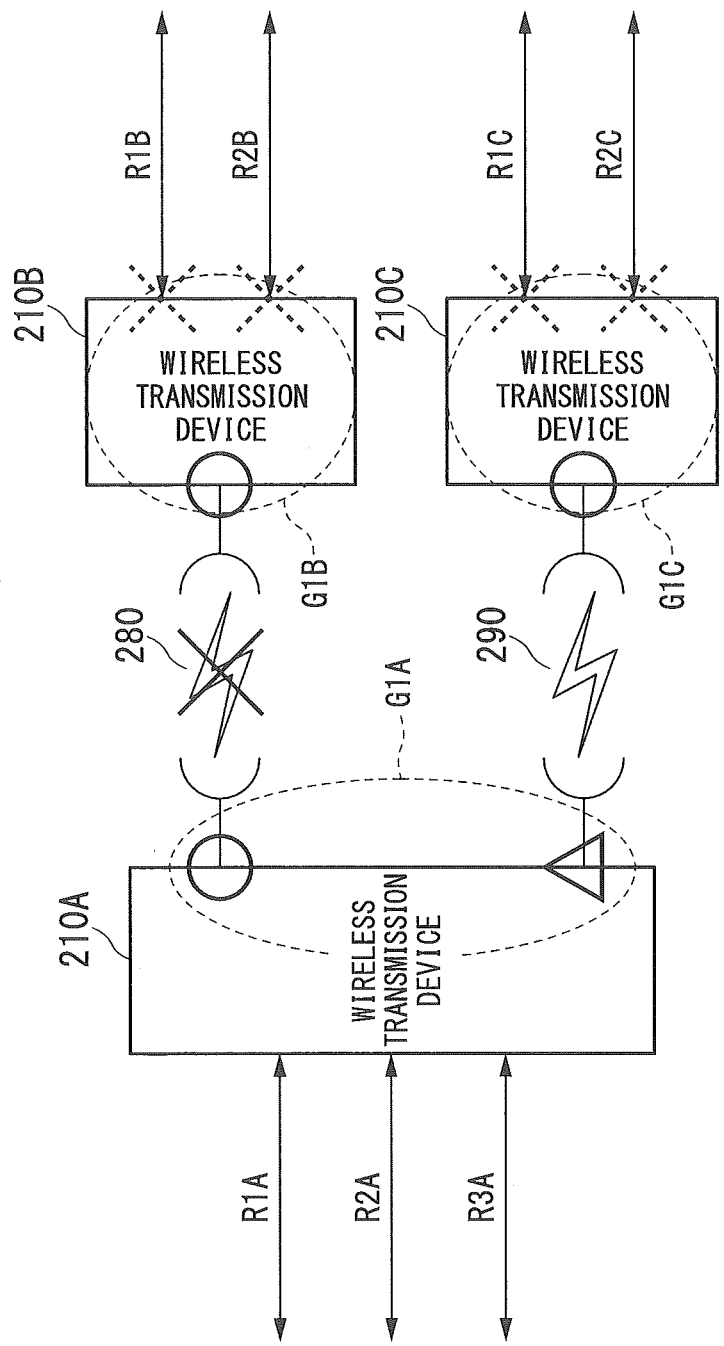
FIG. 9 is a diagram showing an overview of a transmission system in a sixth application example according to the exemplary embodiment.

FIG. 9 is a diagram showing an overview of the transmission system 200 in a sixth application example. When opposing station link cut information TRC or wireless section failure information MS is detected at the wireless port where the priority is high, the wireless transmission device 210A generates link cut information SRC. The wireless transmission device 210A transmits the generated link cut information SRC from the wireless port where the priority is low. The sixth application example is an example showing this type of operation.

The link group setting in the sixth application example is the same as that of the fifth application example. The priority of each wireless port in the sixth application example is the same as that of the third application example. In the fifth application example, a failure is detected in the wireless transmission channel 290 that is connected to the wireless port where the priority is low. On the other hand, in the sixth application example, a failure is detected in the wireless transmission channel 280 that is connected to the wireless port where the priority is high.

The wireless transmission device 210A transmits link cut information SRC to the wireless port where the priority is low, since link cut information SRC is detected at the wireless port where the priority is high. The details of the transmission process are the same as those of the fourth application example, and therefore, descriptions thereof are omitted. Accordingly, link cut information SRC is transmitted to the wireless transmission device 210C. Therefore, communications cannot be made between the wired transmission channels R1A, R2A, and R3A on the wireless transmission device 210A side, and the wired transmission channels R1C and R2C that belong to the link group G1C on the wireless transmission device 210C side. That is to say, the wireless transmission device 210C that has received the link cut information SRC transmitted from the wireless transmission device 210A cuts all of the wired transmission channels R1C and R2C that belong to the same link group G1C as the wireless transmission channel 290 that has received the link cut information SRC.

[Sequence]

Figure 10:
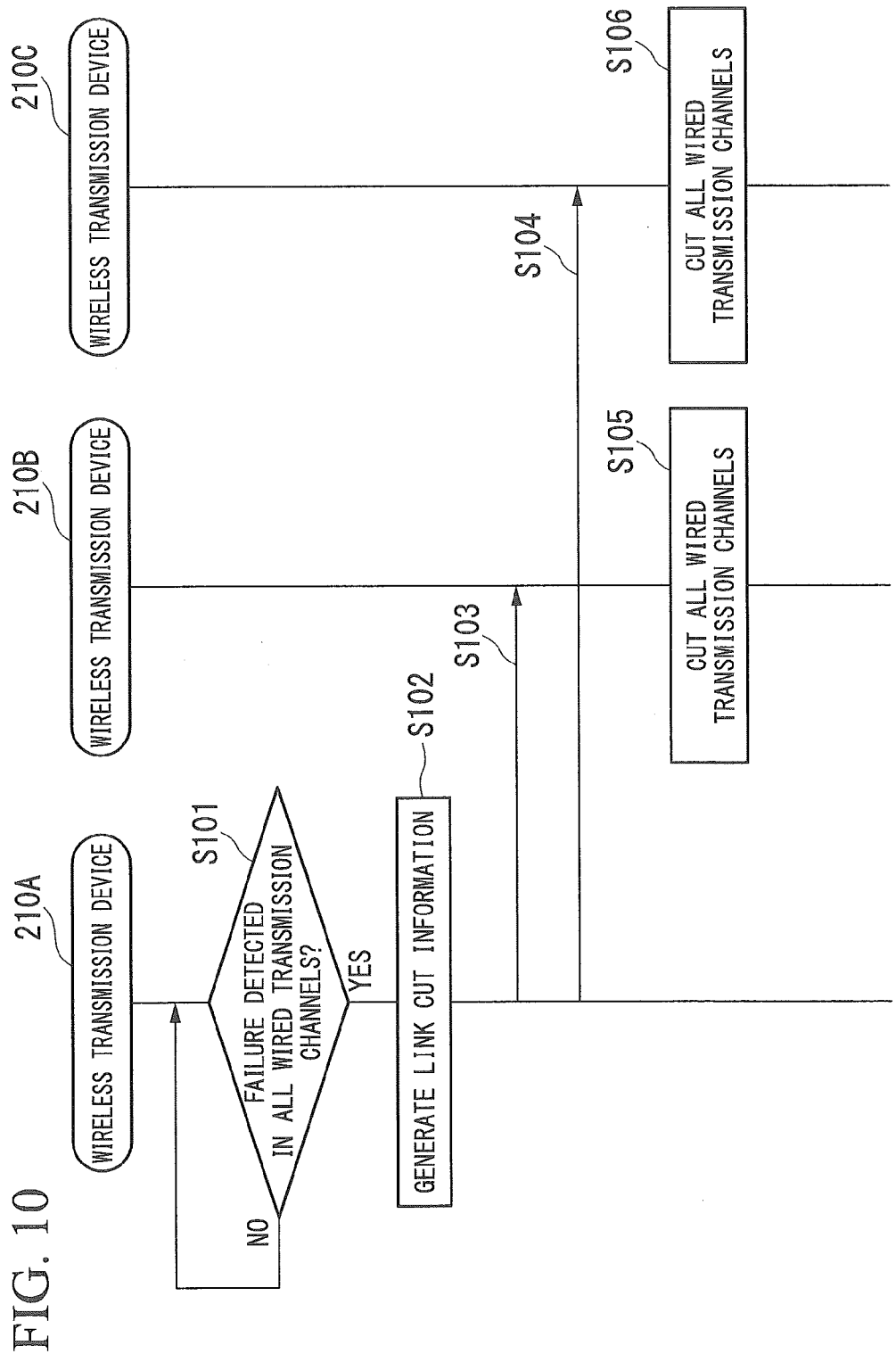
FIG. 10 is a sequence diagram showing a specific example of an operation flow of the transmission system according to the exemplary embodiment.

FIG. 10 is a sequence diagram showing a specific example of a process flow of the operation of the transmission system 200 in a case where a failure is detected in a wired transmission channel in the wireless transmission device 210A. That is to say, FIG. 10 illustrates the flow of the operation corresponding to the first application example and the second application example described above.

First, the wireless transmission device 210A determines whether or not a failure has been detected in all of the wired transmission channels that are set in a link group for each link group set in the self device (step S101). In a case where a failure is detected in some wired transmission channels but it is not detected in all of the wired transmission channels (step S101—NO), the wireless transmission device 210A does not generate nor transmit link cut information. The above process corresponds to the first application example.

One the other hand, in the case where a failure is detected in all of the wired transmission channels (step S101—YES), the wireless transmission device 210A generates link cut information (step S102). The wireless transmission device 210A then transmits the link cut information to the respective wireless transmission devices (210B and 210C) corresponding to the link group in which a failure is occurring in all of the wired transmission channels (steps S103 and S104). Having received the link cut information, the wireless transmission device 210B cuts the link of all of the wired transmission channels included in the corresponding link group (step S105). The wireless transmission device 210C also cuts the links similarly (step S106). The above process corresponds to the second application example.

Figure 11:
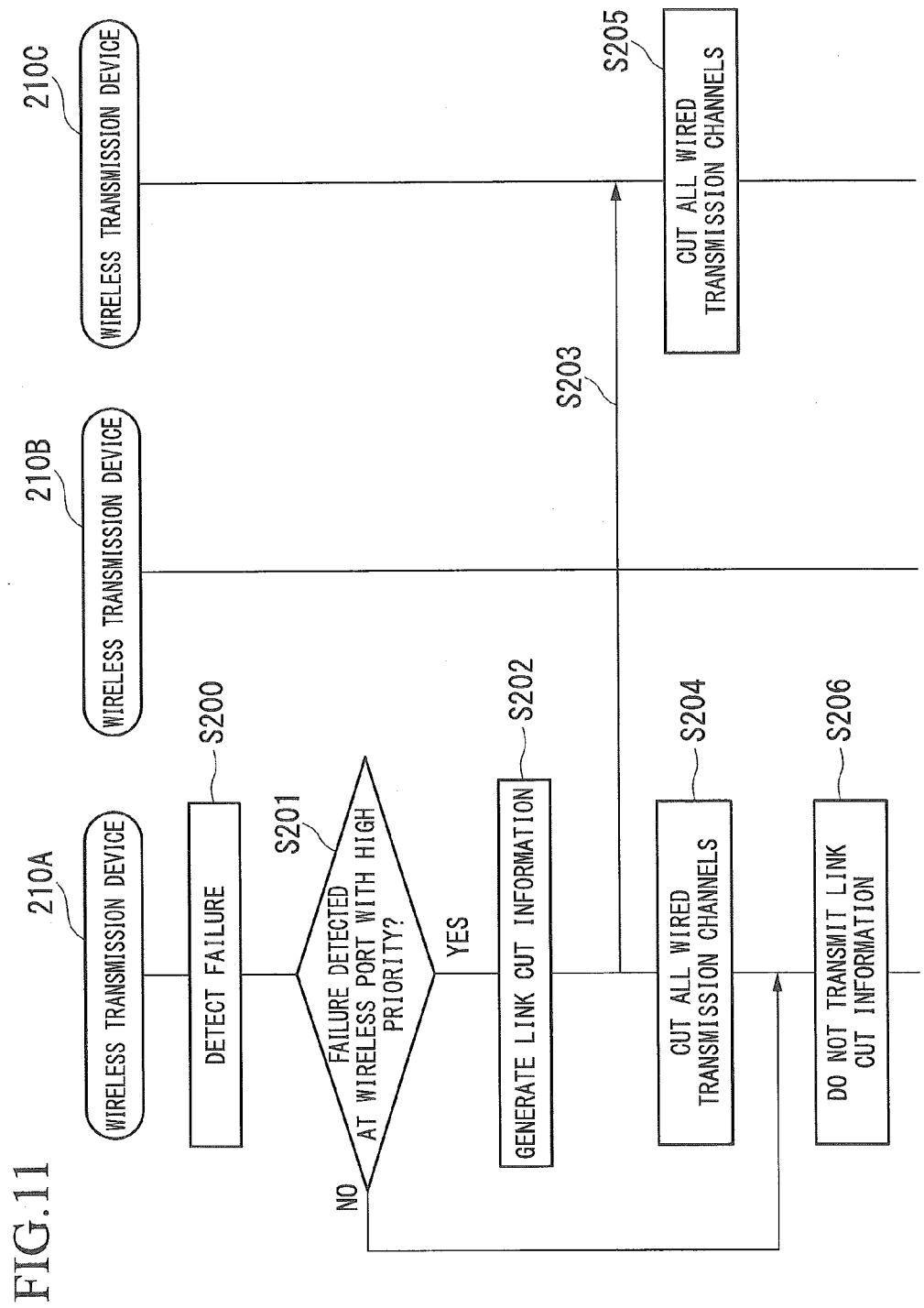
FIG. 11 is a sequence diagram showing a specific example of an operation flow of the transmission system according to the exemplary embodiment.

FIG. 11 is a sequence diagram showing a specific example of a process flow of the operation of the transmission system 200 in a case where a failure is detected on the wireless transmission channel side in the wireless transmission device 210A. That is to say, FIG. 11 illustrates the flow of the operation corresponding to the third application example through the sixth application example described above.

First, the wireless transmission device 210A detects a failure on the wireless transmission channel side (step S200). This failure may be a failure that occurs in a wireless transmission channel or a failure that occurs in an opposing device. Specifically, in the case of a failure occurring in a wireless transmission channel, the control unit 300 detects a failure based on wireless section failure information MS detected and generated by the wireless signal transmitting and receiving unit 270. In the case of a failure occurring in an opposing device, the control unit 300 detects a failure based on opposing device link cut information TRC extracted by the opposing device link cut information extraction unit 260.

The wireless transmission device 210A determines whether or not the priority of the wireless port where the failure has been detected is high (step S201). If the failure is detected at the wireless port where the priority is low (step S201—NO), the wireless transmission device 210A does not transmit link cut information (step S206). The process in this case corresponds to the third application example and the fifth application example.

On the other hand, if the failure is detected at the wireless port where the priority is high (step S201—YES), the wireless transmission device 210A generates link cut information (step S202). The wireless transmission device 210A then transmits the link cut information from the wireless port where the priority is low among the wireless ports belonging to the same link group as the wireless port where the failure has been detected (step S203). In the respective application examples above, the link cut information is transmitted to the wireless transmission device 210C. Moreover, the wireless transmission device 210A cuts all of the wired transmission channels that belong to the same link group as the wireless port where the failure has been detected (step S204).

Having received the link cut information, the wireless transmission device 210C cuts the links of all of the wired transmission channels included in the corresponding link group (step S205). The above process corresponds to the fourth application example and the sixth application example. In the sixth application example, the wireless transmission device 210A does not cut the wired transmission channel, since no wired transmission channel belongs to the same link group as the wireless port where the failure has been detected.

Figure 12:
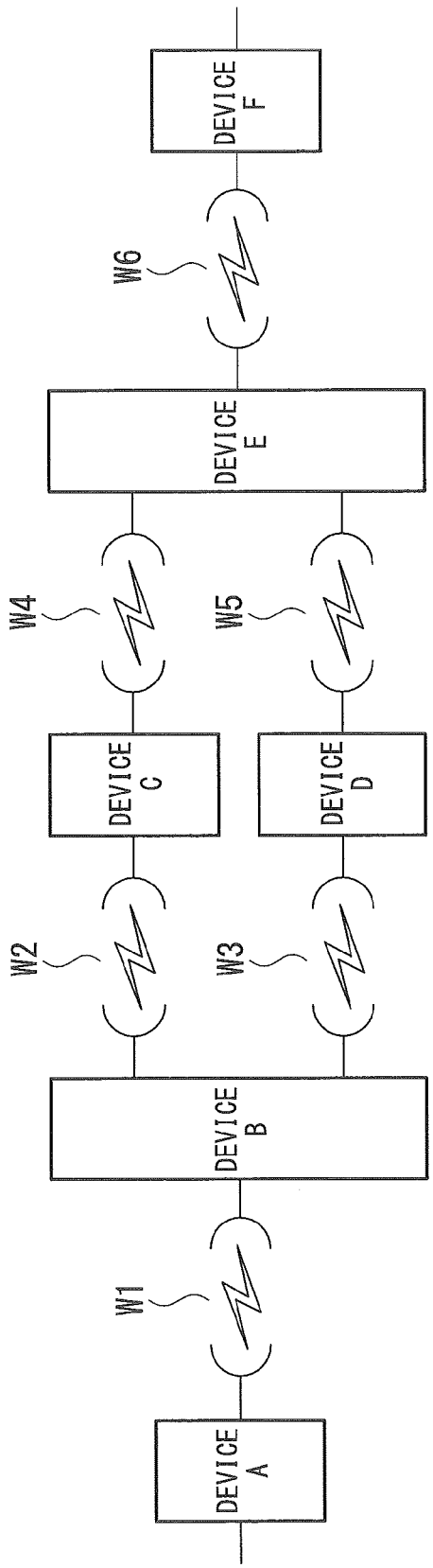
FIG. 12 is a diagram for describing an effect of the exemplary embodiment.

FIG. 12 is a diagram for describing an effect of the present exemplary embodiment. In the transmission system 200, failure notification is possible in a network that is configured only with wireless transmission channels shown in FIG. 12. Each of the devices A through F shown in FIG. 12 is a wireless transmission device 210 described above. As an example, here is described a case where in the link group of the device B, the priority of a wireless transmission channel W1 is set to high, and the priorities of wireless transmission channels W2 and W3 are set to low. When a failure occurs in the wireless transmission channel 1, the device B notifies the devices C and D of the failure via the wireless transmission channels 2 and 3. On the other hand, when a failure occurs in both of the wireless transmission channels W2 and W3, the device B notifies the device A of the failure. However, even if a failure occurs only in either one of the wireless transmission channels (W2 and W3) where the priority is low, the device B does not notify of the failure.

Which failure information to be detected and whether to notify of it can be arbitrarily set by the manner of combining the network. Therefore, a failure notification can be made in arbitrary directions regardless of whether it is wired or wireless.

Since the priority is set for wireless transmission channels, the wireless transmission channel W1 can be distinguished from the wireless transmission channels W2 and W3, and asymmetric link cut control can be performed.

Modified Example

The wireless transmission devices 210 may be configured so as to forward a failure notification rather than cutting the wired transmission channel that belongs to the same link group as the wireless transmission channel where a failure notification has been made. Here is described an operation of the transmission system 200 applied with the wireless transmission devices 210 configured in this manner.

Figure 13:
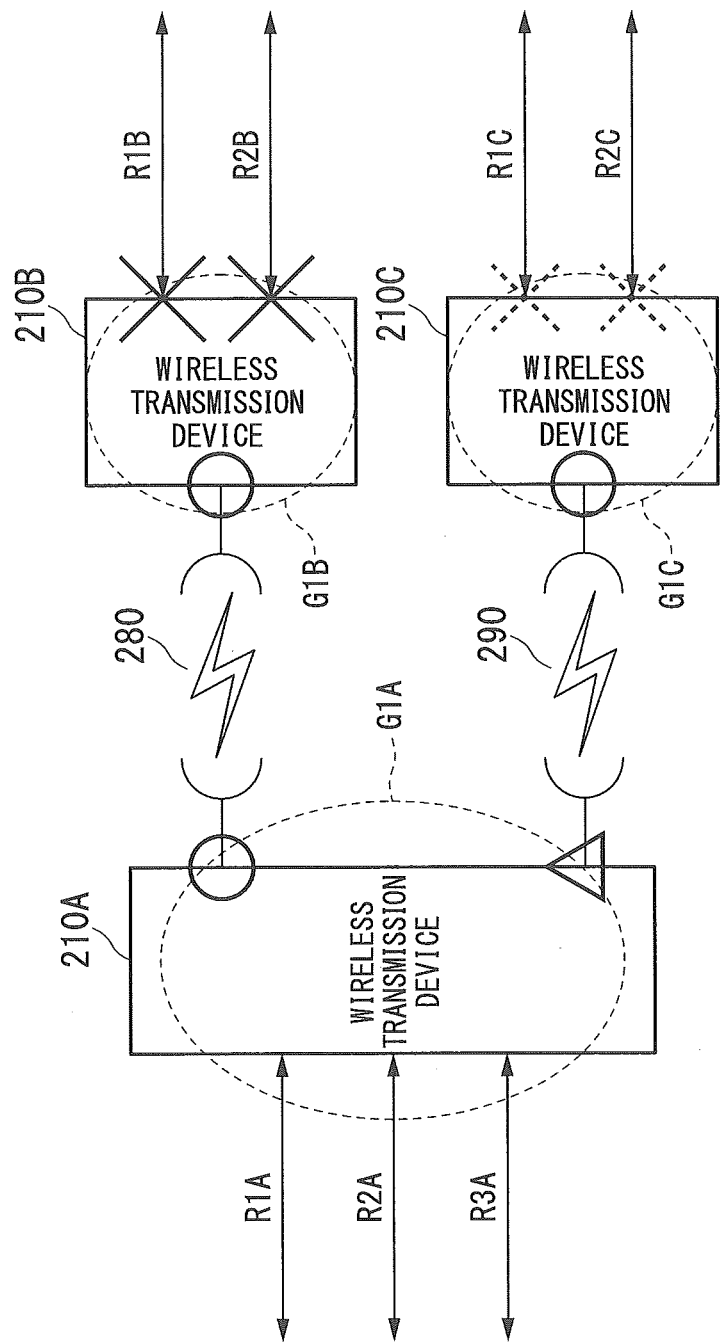
FIG. 13 is a diagram showing an overview of a modified example of a transmission system according to the exemplary embodiment.

FIG. 13 is a diagram showing an overview of a modified example of the transmission system 200. In a case where opposing station link cut information TRC or wireless section failure information MS has been detected at a wireless port where the priority is high, in the fourth application example (FIG. 7) the wireless transmission device 210 cuts all of the wired transmission channels that belong to the same link group as the wireless port. On the other hand, when a failure notification (opposing station link cut information TRC or wireless section failure information MS) is detected at a wireless port where the priority is high, the wireless transmission device 210 in the modified example of the transmission system 200 forwards the failure notification to all of the wired transmission channels that belong to the same link group as the wireless port. At this time, the wireless transmission device 210 does not cut the wired transmission channel.

The link group setting and the priority of each wireless port in FIG. 13 are the same as those in the fourth application example (FIG. 7). In FIG. 13, as with the fourth application example, a failure is detected in the wired transmission channels (R1B and R2B) that belong to the link group G1B.

The wireless transmission device 210A transmits link cut information SRC to the wireless port where the priority is low, since link cut information SRC is detected at the wireless port where the priority is high. Accordingly, link cut information SRC is transmitted to the wireless transmission device 210C. Moreover, the wireless transmission device 210A transmits the link cut information SRC detected at the wireless port where the priority is high to the wired transmission channels R1A, R2A, and R3A. As a result, the other transmission devices connected via the wired transmission channels R1A, R2A, and R3A can receive a notification of the link cut information SRC, and can obtain information of the failure having been detected in the wired transmission channel that belongs to the link group G1B.

In the modified example configured in this manner, there is an effect such that the notification is maintained via the wired transmission channel that belongs to the same link group as the wireless transmission channel, for which the failure notification has been made. That is to say, in a case where multiple traffics are being transmitted via a wired transmission channel (for example, where several users are using the same wired transmission channel on VLAN), if this wired transmission channel is cut, ports for other unrelated users are cut. This type of problem can be solved in the above modified example.

The signal conversion unit 230 does not always need to multiplex the link cut information SRC with the LAN reception data DLS to transmit. For example, having provided a dedicated bandwidth for transmitting and receiving link cut information SRC between wireless transmission devices 210, the wireless signal transmitting and receiving unit 270 may use this bandwidth to transmit/receive link cut information SRC. Moreover, for example, having provided a dedicated path for transmitting and receiving link cut information SRC between wireless transmission devices 210, the wireless signal transmitting and receiving unit 270 may use this path to transmit/receive link cut information SRC. In these cases, the signal conversion unit 230 may perform output to the wireless signal transmitting and receiving unit 270 without multiplexing the link cut information SRC with the LAN reception data DLS. The manner of transmitting and receiving link cut information SRC between the wireless transmission devices 210 is not limited to the examples above, and may involve another manner.

The exemplary embodiment of the present invention has been described in detail with reference to the figures. However, the specific configuration is not limited to this exemplary embodiment, and includes designs without departing the scope of the invention.

This application is based upon and claims the benefit of priority from Japanese patent application No. 2011-247377, filed Nov. 11, 2011, the disclosure of which is incorporated herein in its entirety by reference.

INDUSTRIAL APPLICABILITY

The present invention may be applied to a wireless transmission device, a failure information forwarding method, and a failure information notification method. According to the wireless transmission device, the failure information forwarding method, and the failure information notification method applied with the present invention, failure notification can be performed between transmission devices that are connected to each other via wireless transmission channels.

REFERENCE SYMBOLS

200 Transmission system
210A, 210B, 210C Wireless transmission device
280, 290 Wireless transmission channel
R1A, R2A, R3A, R1B, R2B, R1C, R2C Wired transmission channel
220 LAN signal termination unit
230 Signal conversion unit
240 Signal reproduction unit
250 Opposing device group information extraction unit
260 Opposing device link cut information extraction unit
270 Wireless signal transmitting and receiving unit
300 Control unit
310 Self device group information retention unit 320 Inter-device group information retention unit
330 Link cut information transmitting unit (failure notification unit)
340 Link control unit
350 Wireless port priority retention unit

The invention claimed is:

1. A failure information forwarding method for a wireless transmission device, the failure information forwarding method comprising:
    storing priorities set for a first wireless port of the wireless transmission device and a second wireless port of the wireless transmission device;
    receiving failure information from a first transmission device via a first wireless transmission channel connected to the first wireless port;
    forwarding the failure information to a second transmission device via a second wireless transmission channel connected to the second wireless port in a case where the priority of the first wireless port where a failure has arisen is higher than the priority of the second wireless port; and
    not forwarding the failure information to the second transmission device in a case where the priority of the first wireless port where the failure has arisen is lower than the priority of the second wireless port.

2. The failure information forwarding method according to claim 1, further comprising:
    storing information of transmission channels including the first and second wireless transmission channels belonging to a group among a wired transmission channel connected to the wireless transmission device or the wireless transmission channel.

3. The failure information forwarding method according to claim 2, further comprising:
    forwarding to the second transmission device the failure via the second wireless transmission channel belonging to a same group as that of the first wireless transmission channel.

4. The failure information forwarding method according to claim 1, further comprising:
    forwarding to the second transmission device the failure via the second wireless transmission channel belonging to a same group as that of the first wireless transmission channel in a case where the failure relating to the first wireless port arises.

5. A failure information notification method for a first wireless transmission device, the failure information notification method comprising:
    storing priorities set for a first wireless port of the first wireless transmission device and a second wireless port of the first wireless transmission device;
    detecting a failure in a signal received from a first wireless transmission channel connected to the first wireless port;
    notifying a second wireless transmission device of information related to the failure via a second wireless transmission channel connected to the second wireless port in a case where the priority of the first wireless port where the failure has arisen is higher than the priority of the second wireless port; and
    not notifying the second wireless transmission device of the information related to the failure in a case where the priority of the first wireless port where the failure has arisen is lower than the priority of the second wireless port.

6. The failure information notification method according to claim 5, further comprising:
    storing information of transmission channels including the first and second wireless transmission channels belonging to a group among a wired transmission channel.

7. The failure information notification method according to claim 6, further comprising:
    notifying the second wireless transmission device of the failure via the second wireless transmission channel belonging to a same group as that of the first wireless transmission channel.

8. The failure information notification method according to claim 5, further comprising:
    notifying the second wireless transmission device of the failure via the second wireless transmission channel belonging to a same group as that of the first wireless transmission channel in a case where the failure relating to the first wireless port arises.

* * * * *